June 3, 1941.　　　　F. E. HUSSONG　　　　2,244,108
RELAY VALVE
Filed Jan. 20, 1938　　　　3 Sheets-Sheet 1

FLOYD E. HUSSONG,
INVENTOR.
BY
his ATTORNEY.

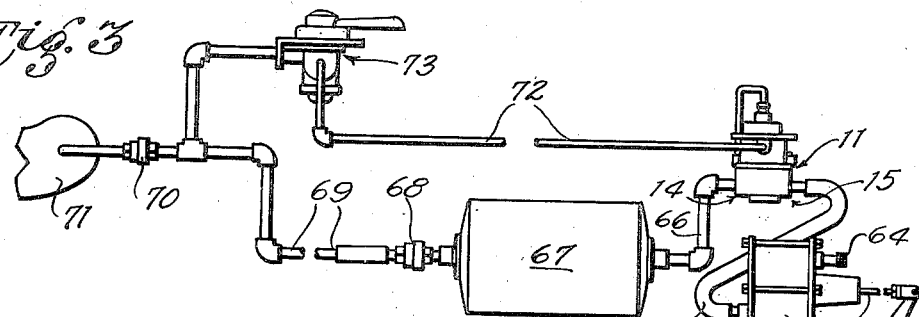
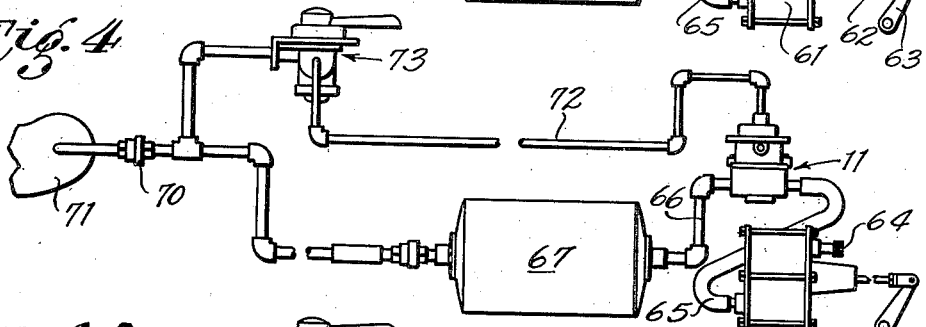
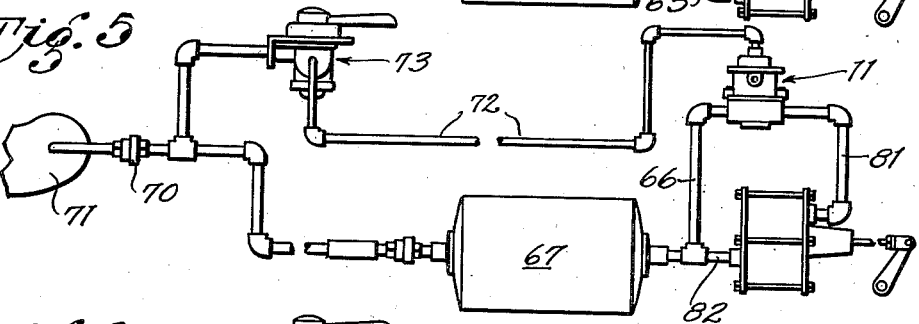
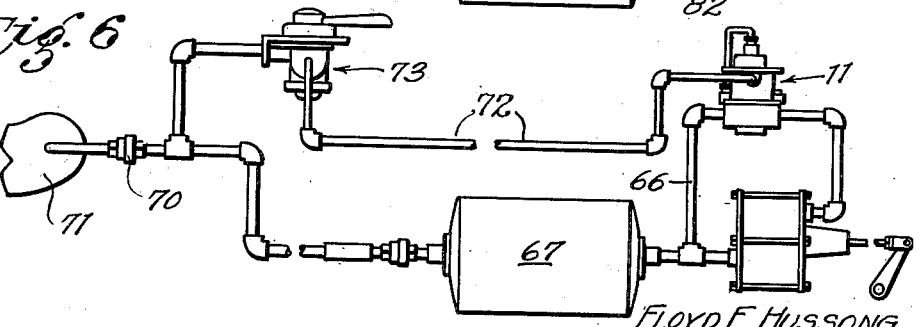

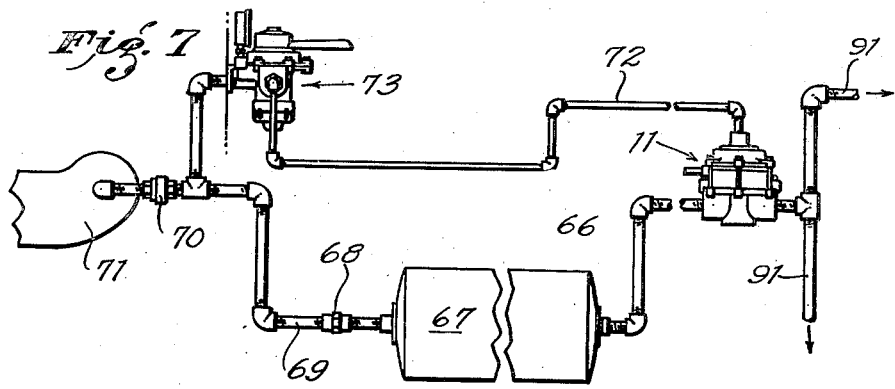
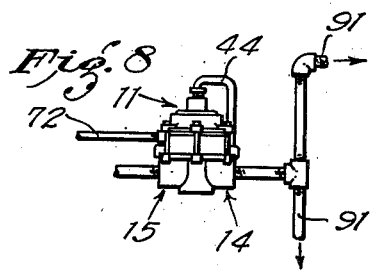

Patented June 3, 1941

2,244,108

UNITED STATES PATENT OFFICE 2,244,108

RELAY VALVE

Floyd E. Hussong, Los Angeles, Calif.

Application January 20, 1938, Serial No. 185,946

2 Claims. (Cl. 303—28)

This invention relates to relay valves, particularly to relay valves for vacuum responsive apparatus, wherein the suction created in the intake manifold of an internal combustion engine is utilized to cause operation of brakes or other equipment of a vehicle such as a passenger car, truck or trailer.

An object of my invention is to provide a relay valve of this class which is particularly adapted to be mounted on trailers or semi-trailers in conjunction with a vacuum tank, or other source of sub-atmospheric pressure.

A further object of this invention is to provide a relay valve which is adapted to be remotely controlled by a control or foot valve such as disclosed in my copending applications, Serial Number 185,979, filed January 20, 1938, now Patent No. 2,208,553, issued July 16, 1940; and Serial Number 185,945, filed January 20, 1938.

A further object is to provide a relay valve which may be variously connected with conventional booster units of air brake apparatus, whether air or vacuum suspended, and whether or not such air brake apparatus is designed for automatic application in the event of a break in the control system; in other words, to provide an air brake relay valve which has a wide range of application.

A further object is to provide a relay valve which utilizes in part the elements comprising valves disclosed in my copending applications hereinbefore referred to, whereby these elements are interchangeable between the several valve constructions.

Another object is to provide a relay valve having a main valve structure operatively associated with a control diaphragm which is so mounted in the relay valve that it may be vacuum or air controlled, depending merely upon the manner in which the relay valve is connected in the air brake system.

A further object is to provide on the whole a particularly simple and rugged relay valve fully capable of efficient operation at all times even under extreme conditions and in spite of neglect.

Other objects, advantages and features of invention may appear from the accompanying drawings, the subjoined detail description, and the appended claims.

The accompanying drawings illustrate the invention in a form I at present deem preferable.

Fig. 3 is a diagrammatical view showing the manner of connecting my relay valve in a braking system whereby the booster units are air suspended and the relay valve arranged to cause automatic application of the brakes should a leak occur in the control line.

Fig. 4 is a similar diagrammatical view also with the booster unit air suspended, but with the relay valve arranged to eliminate automatic operation of the brakes.

Fig. 5 is another diagrammatical view of a braking system with a vacuum suspended booster unit and my relay valve arranged in the system to effect automatic operation of the brakes should a leak or break occur in the control line.

Fig. 6 is a further diagrammatical view similar to Fig. 5, but showing the relay valve arranged to omit automatic operation of the brakes.

Figs. 7 and 8 are further diagrammatical views illustrating the manner in which the relay valve is connected in the line between a vacuum tank and a plurality of booster units.

Figure 1:
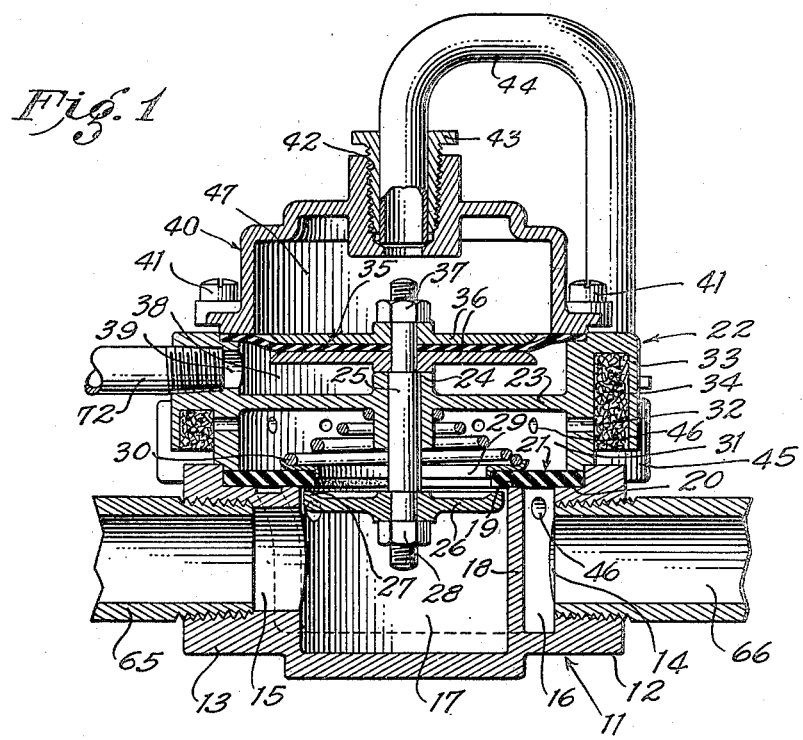
Figure 1 is a sectional view through my relay valve taken substantially along the line 1—1 of Fig. 2 showing the various parts in their normal position when the main valve is closed and pressure on opposite sides of the control diaphragm is equalized.
Figure 2:
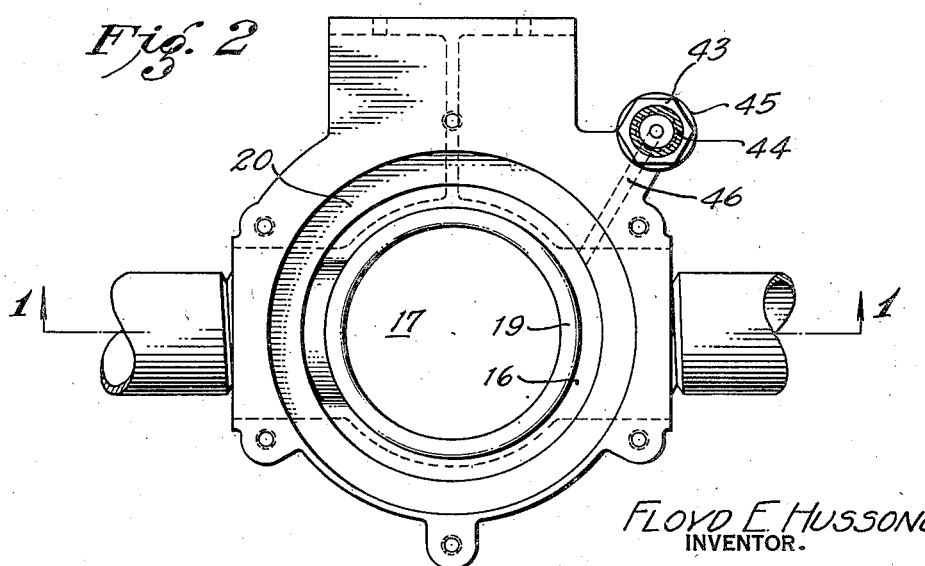
Fig. 2 is a plan view of the housing with the main or diaphragm valve and parts thereabove removed.

Reference is first directed to Figs. 1 and 2. The structure therein disclosed includes a housing 11, preferably in the form of a casting having aligned bosses 12 and 13 which are bored to form main ports 14 and 15 respectively, these being threaded at their outer extremities. The port 14 intersects an annular vacuum chamber 16; while port 15 extends through the vacuum chamber and intersects a centrally disposed air chamber 17. Both chambers are closed at their lower ends, open at their upper ends, and are separated by an annular wall 18 the upper end of which forms a valve seat 19.

The upper end of the housing 11 is enlarged and an annular shoulder 20 surrounds the upper end of the vacuum chamber 16 and receives the margin of a main or diaphragm valve 21. The main valve is in the form of a flat flexible disk composed of leather, rubber, or more preferably of an oil-resistant synthetic substance, and its inner periphery overhangs and coacts with the valve seat 19.

A short cylindrical intermediate shell 22 fits over the upper end of the housing 11 and includes a lip adapted to bear against and clamp the margin of the ring valve 21. The shell 22 is divided by a diametrical partition 23 in which is centered a sleeve 24, which is disposed coaxially with the air and vacuum chambers 16 and 17. The sleeve 24 receives a stem 25 which projects through the opening in the main or diaphragm valve 21 and is threaded to receive a valve lifting disk 26 having a rudimentary upturned rim, a valve face 27 adapted to engage the inner periphery of the main valve 21 to lift the same from its seat 19 as well as close its central opening. A lock nut 28 secures the disk 26 in place.

A retainer ring 29 rests upon the inner margin of the main or ring valve 21 and is provided with a downturned inner rim to retain itself in place, and an upturned outer rim to receive the lower and larger end of a frusto-conical spring 30. The upper or smaller end of this spring fits around the lower portion of the stem 25.

The shell 22 below its partition 23 constitutes a bleeder chamber 31 which is intersected by radial bleeder ports 32. Around the periphery of the shell 22 there is provided a spaced depending skirt 33 attached at the upper end of the shell and overhanging the ports 32. The annular portion between the skirt and shell 22 is filled with suitable strainer material 34 to minimize introduction of deleterious matter through the bleeder ports.

The upper end of the shell 22 is provided with a recessed shoulder in which fits the periphery of a control diaphragm 35. The control diaphragm is formed of flexible material similar to the main or diaphragm valve. The central portion of the control diaphragm is reinforced by a pair of plates 36 secured on the upper end of the stem 25 and caused to clamp the control diaphragm by reason of a nut 37. When the main valve 21 is seated, and the valve lifting disk clears the same sufficiently to permit adequate flow of air therearound, the lowermost plate 36 rests on the upper end of the sleeve 24.

A lower control chamber, designated 38 is formed between the diaphragm 35 and partition 23. This chamber is intersected by a port 39 extending through the skirt 33 and is either exposed to the atmosphere or connected to a vacuum pipe as will be disclosed hereinafter.

The diaphragm 35 is secured in place by a cap housing 40 which fits over the shell 22 and is provided with a lip engaging the margin of the diaphragm. Suitable screws 41 extend downwardly from the cap housing along the sides of the shell 22 and screw into the bottom or main housing 11.

The cap housing 40 is in the form of an inverted cup and is provided with a centered gland socket 42 which receives a tube clamping nut 43 designed to secure the end of a U-tube 44 in the socket. The other end of the tube 44 is secured by a similar gland to a boss 45 provided in the side of the main housing 11 through which a duct 46 leads into the vacuum chamber 16, as shown best in Fig. 2. The diaphragm 35 and cap housing form an upper control chamber 47.

Reference is now directed to Figs. 3 to 8 which illustrate various hook-ups between the relay valve and the air brake system of a vehicle. In Fig. 3, a booster unit 61 which comprises a piston and cylinder arrangement, is shown as connected by its piston rod 62 to a brake rod lever 63. One side of the booster unit is equipped with an air strainer 64 and this side is, therefore, always open to atmosphere. Such an arrangement is known as an "air suspended" mounting. The other side of the booster unit 61 is connected through a hose 65 to the main port 15 communicating with the air chamber 17. The port 14 associated with the vacuum chamber 16 is connected through a pipe 66 to a vacuum tank 67 which is in turn connected through a check valve 68 and pipe 69 and additional check valve 70 to the intake manifold 71 of an internal combustion engine. With the installation shown in Fig. 3, the lower control chamber 38 is connected through tubing 72 to a control valve 73 such as disclosed in my copending applications hereinbefore identified. The control valve 73 is, in turn, connected to the pipe 69 adjacent the intake manifold of the engine.

When the relay valve is so installed, atmospheric pressure must exist in the air chamber 17 to balance the air introduced through the strainer 64 of the booster unit in order to release the brakes. This is occasioned by the release of the valve lifting disk from the main or diaphragm valve 12 and thereby permitting atmospheric pressure to be maintained in the air chamber 17 by means of atmospheric pressure being admitted thereto through the radial bleeder port 32 the bleeder chamber 31 through the central opening in the main valve 21 and thence around the valve lifting disk 26 into the air chamber 17 from which it is permitted to flow through the hose 65 to thereby balance the air introduced through the strainer 64 of the booster unit and which compensation of atmospheric air on both sides of the air suspended booster unit 61 will cause the release of the brakes because of the equalizing movement of the piston usually formed in the booster unit 61 by the compensation on each side thereof of atmospheric pressure. To do this a vacuum must be maintained in the lower control chamber 38 to balance the vacuum in the upper control chamber 47 by reason of the communication afforded through the U-tube from the vacuum chamber 16. Furthermore, the control valve 73 must communicate with the source of vacuum pressure to maintain this condition. Upon disconnecting the control valve 73 from the source of vacuum pressure and exposing the line 72 to air pressure through the valve 73, the control diaphragm 35 raises and opens the main or diaphragm valve 21 connecting vacuum chamber 16 with air chamber 17 and sealing the air chamber from the bleeder chamber 31. This is accomplished by operation of the valve 73 which exposes the line 72 to air pressure and permits atmospheric pressure to enter chamber 38 through line 72 thus raising valve 21, as aforesaid, and sub-atmospheric pressure is admitted to booster 61 through hose 65 or tank 67 or line 69 and tank 67 to operate the booster to apply the brakes; this is further accomplished by reason of the fact that sub-atmospheric pressure or vacuum will be applied through port 46 through tube 44 and into the upper control chamber 47 thereby aiding the atmospheric pressure admitted to the lower control chamber 38 through a "broken line" to raise the control diaphragm into main diaphragm 21 to permit the vacuum to apply the brakes through the hose 65. Thus, arranging the parts as shown in Fig. 3 and mounting the relay valve, booster unit, and vacuum tank on a trailer, for example, the brakes are automatically applied should the trailer break away from the truck. This is because, in the event a trailer is connected to my relay valve the breaking way thereof from the main truck would automatically break the line 72 permitting atmospheric pressure to be admitted to the chamber 38 and operating the main diaphragm valve 21 and permitting communication of the vacuum storage tank mounted on the trailer through line 66 and vacuum chamber 16 to the air chamber 17 and hose 65 to operate the booster unit to apply the brakes.

If the above feature is not desired, the relay valve may be mounted as shown in Fig. 4. In this arrangement the lower control chamber 38 is ported to atmosphere and duct 46 is plugged and tubing 44 omitted. Tubing 72 is now connected to the upper control chamber 47, and the relief valve or bleeder valve 21 operates in the reverse order to its arrangement in Fig. 3. That is, the upper control chamber 47 must be open to atmosphere to maintain the main valve 21 closed while the air chamber is open around the disk 26 and through the bleeder chamber 31, in order to hold the brake free. The brakes are applied by opening the control valve to the sub-atmospheric pressure of the intake manifold, which causes the main valve to raise, closing communication between the air and vacuum chambers 17 and 16.

In Fig. 5, the booster unit is shown as "vacuum suspended," that is, a vacuum is normally maintained on both sides of the booster unit in order to hold the brakes released. This is accomplished by connecting with a pipe 81 the opening 14 and air chamber 17 with the side of the booster unit formerly provided with the air strainer 64. The connection between the vacuum chamber 16 and the vacuum tank 67 is still maintained through pipe 66, but an extension 82 leads from the pipe 66 to the side of the booster unit formerly served by the hose 65. If the connections between the relay valve and control valve are maintained as shown in Fig. 4, the system again becomes "automatic," that is, failure in the tubing 72 will cause application of the brakes. In other words, communication from the air chamber 17 through the bleeder chamber 31 causes air to enter pipe 81 and apply the brakes, and this communication will be established should the vacuum in the upper control chamber 47 be relieved.

With reference to Fig. 6, it will be seen that by restoring the connections between the relay valve and control valve to those shown in Fig. 3, the "vacuum suspended" arrangement of Fig. 6 functions without the automatic feature of Fig. 5.

Figs. 7 and 8 illustrate the manner in which the relay valve may be positioned to control a plurality of booster units, and in these figures 91 represents the distributor pipes substituted for pipe line 65.

The valve seat 19, although not discernible in the drawing, is nevertheless, made so that one side of the annular valve seat is approximately one sixty-fourth ($1/64$) of an inch higher on one side than on the other. This causes an easier application of brakes by decreasing the amount of pull required to lift the diaphragm from the seat. This tends to permit the diaphragm to be lifted from the seat 19 with a less vacuum than would otherwise be required in the event the valve seat 19 were made of uniform or even height whereby the pull or suction of the vacuum would require the diaphragm 21 to be lifted from the valve seat 19 around its entire periphery. This results in a much more even application of the brakes through the relay valve because of the fact that when the diaphragm 21 is first lifted from the valve seat 19 the interchange of atmospheric pressures is more gradual by virtue of lifting the diaphragm off of the valve seat at its higher or at its lower point than in the event the diaphragm was lifted from the valve seat in its entirety which might result in the event the valve seat 19 were made of uniform height.

As indicated in Figs. 3 through 8, the relay valve is capable of installation in many different ways and inherently adaptable to a wide variety of booster brake systems, whereby my relay valve is particularly suitable for installation by way of repair or replacement without special adapters and fittings.

Though I have shown and described a particular embodiment of my invention, I do not wish to be limited thereto, but desire to include in the scope of my invention such constructions, combinations, and arrangements as may be embraced and defined in the accompanying claims.

I claim:

1. A relay valve structure for vacuum brake systems comprising: a housing structure defining a pair of substantially concentric chambers open at a common end and separated by a valve seat; an annular diaphragm valve covering the outer chamber, engaging said valve seat, overlapping the margins of the inner chamber, and having a central bleeder port for venting the inner chamber to atmosphere; a relief valve for said bleeder port, said relief valve mounted in the inner chamber and movable to raise said diaphragm valve from its seat upon closing said bleeder port whereby said inner chamber may be vented through said bleeder port or established in communication with said outer chamber; a housing element covering the diaphragm valve and clamping the margins thereof to define a bleeder chamber; a cap housing overlying said housing element; a control diaphragm clamped between said cap housing and housing element and forming with said housings opposed control chambers; and means operatively connecting said control diaphragm with said relief valve.

2. A relay valve structure for vacuum brake systems comprising: a substantially cylindrical intermediate housing having a partition therein; a cap housing covering one end of said intermediate housing; a main housing covering the other end thereof, the main housing defining a pair of main chambers opening toward said intermediate housing; a diaphragm valve interposed between the main housing and intermediate housing to control communication between said main chambers, said diaphragm valve having a bleeder port therein registering with one of said main chambers; said diaphragm valve defining with said intermediate housing a vented bleeder chamber; a relief valve engageable with said diaphragm valve to close said bleeder port and regulate said diaphragm valve to control communication between said main chambers; a control diaphragm interposed between said cap housing and intermediate housing to form a pair of opposed control chambers; and means operatively connecting said relief valve with said control diaphragm.

FLOYD E. HUSSONG.